United States Patent
Ishii et al.

[11] Patent Number: 5,982,416
[45] Date of Patent: Nov. 9, 1999

[54] IMAGE PROCESSING METHOD AND APPARATUS

[75] Inventors: Yoshiki Ishii, Yokohama; Masamichi Ito, Machida, both of Japan

[73] Assignee: Canon Kabushiki Kaisha, Tokyo, Japan

[21] Appl. No.: 08/773,896

[22] Filed: Dec. 27, 1996

[30] Foreign Application Priority Data

Dec. 28, 1995 [JP] Japan .................................... 7-343104
Dec. 25, 1996 [JP] Japan .................................... 8-345438

[51] Int. Cl.⁶ .............................. H04N 7/00; H04N 7/18; G03F 3/08
[52] U.S. Cl. ............................. 348/29; 348/30; 348/96; 348/97; 348/98; 348/502; 348/576
[58] Field of Search ................................... 348/29, 30, 96, 348/97, 98, 99, 101, 104, 105, 502, 576, 577, 646, 649, 655; 382/166, 167, 100, 112, 113; 358/518, 520, 522

[56] References Cited

U.S. PATENT DOCUMENTS

| | | | |
|---|---|---|---|
| 4,907,071 | 3/1990 | Belmare-Sarabia et al. ............. | 348/97 |
| 5,067,010 | 11/1991 | Ishii et al. .................................. | 358/13 |
| 5,093,717 | 3/1992 | Sandrew ..................................... | 348/30 |
| 5,136,379 | 8/1992 | Ishii et al. .................................. | 358/21 |
| 5,260,787 | 11/1993 | Capitant et al. ........................... | 348/96 |
| 5,374,954 | 12/1994 | Mowry ....................................... | 348/29 |
| 5,534,915 | 7/1996 | Sandrew ..................................... | 348/29 |
| 5,646,750 | 7/1997 | Collier ....................................... | 358/518 |
| 5,694,484 | 12/1997 | Cottrell et al. ............................ | 382/167 |
| 5,742,350 | 4/1998 | Pan et al. ................................... | 348/453 |

*Primary Examiner*—Anand S. Rao
*Attorney, Agent, or Firm*—Fitzpatrick, Cella, Harper & Scinto

[57] ABSTRACT

An image processor which provides a color space conversion characteristic suitable for an image includes a transfer unit which transfers digital color image data representing a desired image input by an image input unit and having a color space depending on the image input unit, and extraction unit which extracts a color space conversion characteristic used to convert the color space depending on the image input unit into another color space. The transfer unit transfers the digital color image data having the color space depending on the image input unit and the color space conversion characteristic.

20 Claims, 21 Drawing Sheets

| INPUT CHARACTERISTIC | COLOR SPACE CHARACTERISTIC INDEX |
|---|---|
| 1 | |
| ⋮ | INDEX #1 |
| X | |
| X + 1 | |
| ⋮ | INDEX #2 |
| Y | |
| Y + 1 | |
| ⋮ | INDEX #3 |
| Z | | ns
IMAGE PROCESSING METHOD AND APPARATUS

BACKGROUND OF THE INVENTION

1. Field of the Invention

The present invention relates to an image processing apparatus and method associated with color matching processing for digital color image data and transfer of a profile used for color matching processing.

2. Related Background Art

In recent years, along with the development of digital coding techniques, methods of compressing/coding image data and transmitting the image data as digital data have been established to enable transmission of high-quality video data obtained by, e.g., a video camera. In a multimedia system having a host computer as a core equipment, extensive studies of a color matching system (to be referred to as a CMS hereinafter) for matching the color appearances between input image data and output devices have been made. In ColorSync of Apple computer Inc., which is one of the frameworks of representative CMSs, the device dependent color space of an input device is converted into an independent color space, thereby realizing common CMS processing. For this conversion processing, data (profile) representing the device dependent color space conversion characteristic is prepared in the host computer in units of devices, so that the color space is converted in accordance with the conversion characteristic which is automatically or manually selected in conversion processing.

FIG. 21 is a block diagram showing the relationship between an image transmission technique and a CMS in the prior art. On the transmission side, digital image data is input from a terminal 1601. An error correction coding circuit 1602 adds parity data for correcting data errors on the transmission line to the digital image data. The digital image data to be sent to the transmission line is subjected to packeting and modulation by a transmission line coding circuit 1603, and transmitted from a terminal 1604. In a host computer 1605 on the reception side, a transmission line decoding circuit 1607 decodes the transmission data supplied from a terminal 1606 and extracts a data block from the transmission packet. The data is subjected to transmission line error correction processing by an error correction circuit 1608 and output from a terminal 1609 as digital image data. Color space characteristic data for CMS processing is prepared in advance as a permanent data file 1610 in the host computer. Therefore, the color space characteristic data does not dynamically reflect the characteristic of the transmitted digital image data.

In the conventional system, when, e.g., a flatbed scanner is directly connected to the host computer, and the characteristic of the input device itself does not change, the effect of CMS processing can be expected by using the conversion characteristic data stored in the host computer. However, assume that a signal whose characteristic in the actual read process cannot be specified, like compressed and coded digital image data and, particularly video camera image data largely depending on the adjustment state in a pickup operation, is digitally coded, transmitted, and subjected to CMS processing. In this case, only with the conversion characteristic data prepared in the host computer, no sufficient effect can be expected. In addition, erroneous conversion is undesirably performed in accordance with an unsuitable characteristic.

SUMMARY OF THE INVENTION

The present invention has been made in consideration of the above situation, and has as its first object to enable more preferable image processing than the prior art.

It is another object of the present invention to always provide a color space characteristic suitable for an image.

It is still another object of the present invention to select a profile suitable for a particular image pickup condition.

It is still another object of the present invention to obtain a reproduced image whose colors match those of a moving picture.

In order to achieve the above objects, according to the present invention, there is provided an image processing apparatus comprising transfer means for transferring digital color image data representing a desired image input by image input means and having a color space depending on the image input means, and extraction means for extracting a color space conversion characteristic used to convert the color space depending on the image input means into another color space, wherein the transfer means transfers the digital color image data having the color space depending on the image input means and the color space conversion characteristic.

According to another aspect of the present invention, there is provided an image processing apparatus comprising storage means for storing a plurality of profiles corresponding to desired image pickup conditions, input means for inputting an image pickup condition which is set when a desired image is obtained, selection means for selecting a profile suitable for the image pickup condition from the plurality of stored profiles, and transfer means for transferring image data representing the desired image in correspondence with the selected profile.

According to still another aspect of the present invention, there is provided an image processing method in which a moving picture is input, subjected to color matching processing, and output to desired image output means, comprising the steps of inputting the moving picture, performing color matching processing on the basis of a profile of the image output means such that a color appearance of the moving picture is faithfully reproduced by the image output means, and outputting the moving picture which has undergone color matching processing to the image output means.

It is an additional object of the present invention to provide a new color processing method.

It is a further object of the present invention to provide a color processing method adaptable to moving picture data processing.

Other objects and features of the present invention will be apparent from the following description of preferred embodiments and the accompanying drawings.

DETAILED DESCRIPTION OF THE PREFERRED EMBODIMENTS

First Embodiment

Figure 1:
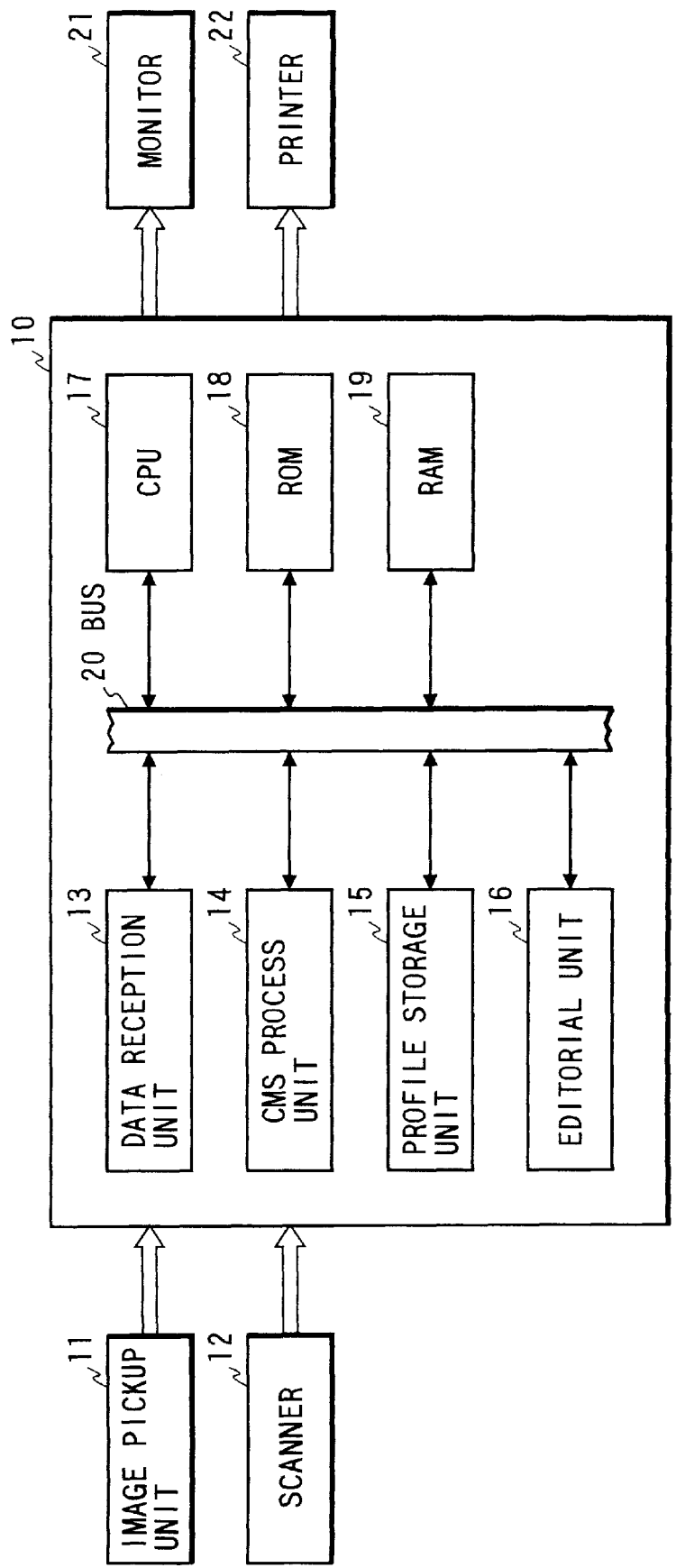
FIG. 1 is a block diagram showing a system configuration.

FIG. 1 is a block diagram showing a system configuration. This system is constituted by an image pickup unit 11 and a scanner 12 which serve as input devices, a host computer 10 for performing edit processing and CMS processing, and a monitor 21 and a printer 22 which serve as output devices.

The image pickup unit 11 is a video camera, a digital camera, or the like whose environmental condition and adjustment state in pickup operations are not fixed. Since the input characteristic changes for every pickup operation, the input characteristic cannot be specified.

The image pickup unit 11 can process both moving picture data and still picture data.

The scanner 12 exposes an original and reads reflected light by a light-receiving element, thereby generating image data. Since the read environment is substantially stable, the input characteristic can be specified in advance.

The monitor 21 outputs image data on the basis of a RGB additive mixture of color stimuli.

The printer 22 forms an image on a recording medium with a recording agent on the basis of a subtractive mixture of color stimuli.

For the monitor 21 and the printer 22, the light-emitting element of the monitor and the recording agent of the printer can be specified in advance. Therefore, the output characteristics can be specified in advance.

In the host computer 10, a CPU 17 controls the respective process units by using a RAM 19 on the basis of a program stored in a ROM 18 to perform edit and CMS processing for input image data from the image input device, and the image data is output to the output device, e.g., the monitor 21 or printer 22.

Figure 4:
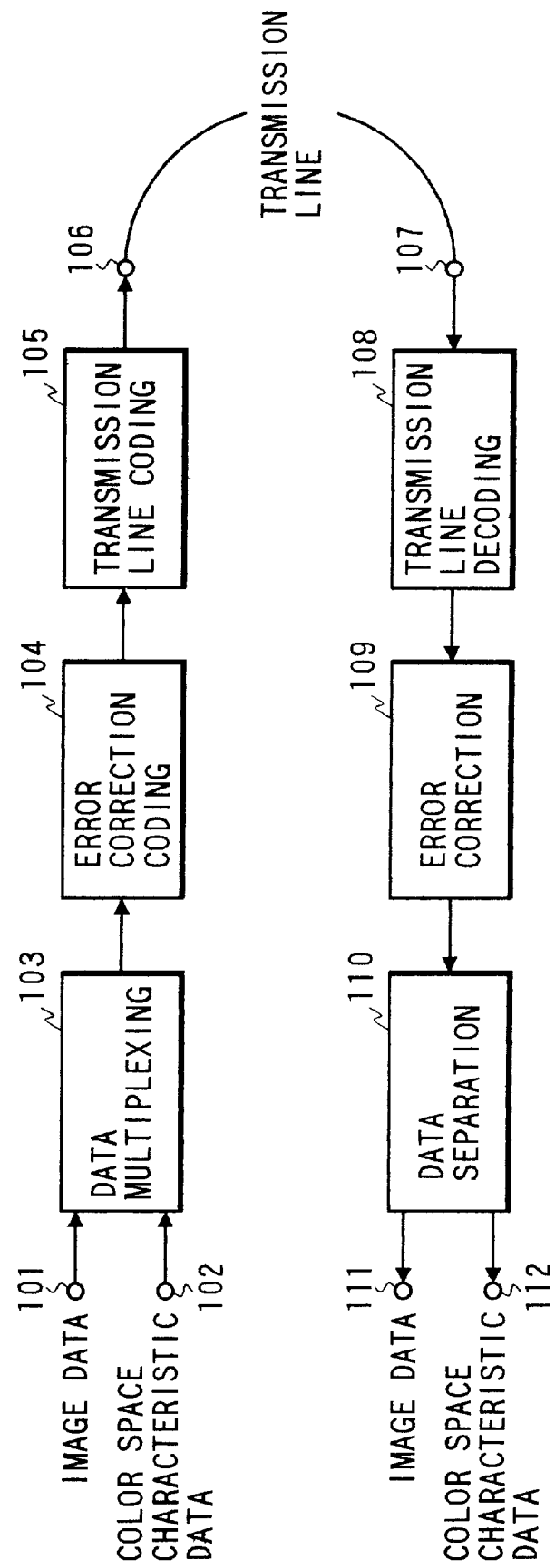
FIG. 4 is a block diagram showing the configuration of a digital image transmission scheme.

A data reception unit 13 comprises a transmission line decoding circuit 108, an error correction circuit 109, and a data separation circuit 110 shown in FIG. 4. An editorial unit 16 such as DTP software synthesizes a plurality of images input from the image input device, and performs edit processing for an input image.

A CMS process unit 14 performs image processing for color appearance matching between the devices as shown in FIG. 4.

This system can take the following combinations of input and output devices.

(1) image input device (image pickup unit 11 or scanner 12)—monitor 21

(2) image input device (image pickup unit 11 or scanner 12)—printer 22

(3) printer 22—monitor 21

(4) monitor 21—printer 22

(3) is processing called preview processing in which an image to be formed by the printer 22 is confirmed in advance as an image displayed on the monitor 21.

Figure 3:
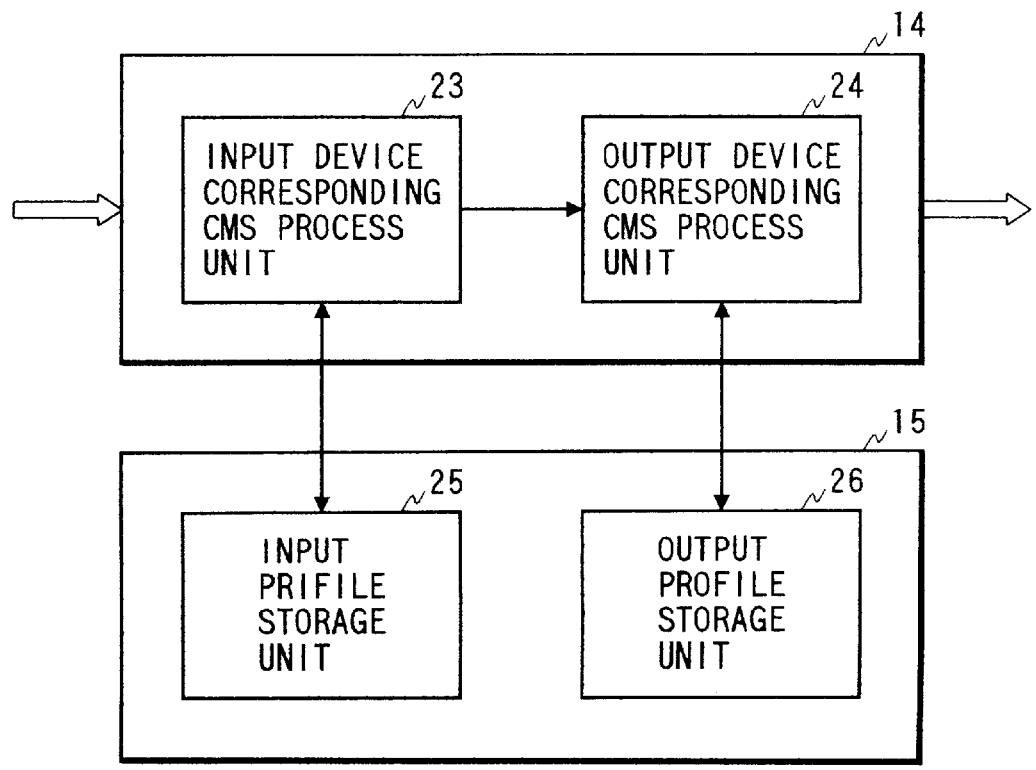
FIG. 3 is a block diagram showing the arrangement of a CMS process unit.

FIG. 3 shows the arrangement of the CMS process unit 14 for performing CMS processing corresponding to each of these combinations.

The CMS process unit 14 comprises an input device corresponding CMS process unit 23 and an output device corresponding CMS process unit 24. These CMS process units read out profiles from a profile storage unit 15 in correspondence with the input and output devices, respectively.

Conversion data representing the relationship between device dependent color spaces and device independent color spaces are stored as profiles. Therefore, an input profile storage unit 25 stores conversion data (input profile data) which is used to convert each input device dependent color space into a device independent color space. On the other hand, an output profile storage unit 26 stores conversion data (output profile data) which are used to convert device independent color spaces into output device dependent color spaces.

The output profile data may be conversion data including color space compression processing for converting input image data within the color reproduction range of an output device.

The CMS process unit 14 reads out, from the input profile storage unit 25, input profile data corresponding to the type of input device on the basis of the combination of the input and output devices, and converts input image data dependent on the input device into image data on a device independent color space by using the input profile data. Next, the CMS process unit 14 reads out, from the output profile storage unit 26, output profile data corresponding to the type of output device, and converts the device independent image data into image data on the output device dependent color space by using the output profile data.

As described above, the profile data used by the CMS process unit 14 are conversion data based on the device characteristics.

Since the characteristic of the monitor 21 or printer 22 can be specified in advance, as described above, conversion data corresponding to the specified characteristic can be stored as a profile.

To the contrary, the characteristic of the image pickup unit changes depending on the input image. To store profiles suitable for input images, a large memory capacity is required, resulting in a decrease in efficiency of the system configuration.

To solve this problem, in this embodiment, profile data (i.e., color space characteristic data) is transmitted from the image pickup unit to the host computer together with image data. With this arrangement, CMS processing can always be performed using profile data suitable for image data.

This embodiment will be described below with reference to the accompanying drawings. Note that digital image data may be compressed and coded by a compression/coding technique using DCT or the like.

FIG. 4 is a block diagram showing a digital image transmission scheme according to this embodiment.

Figure 5:
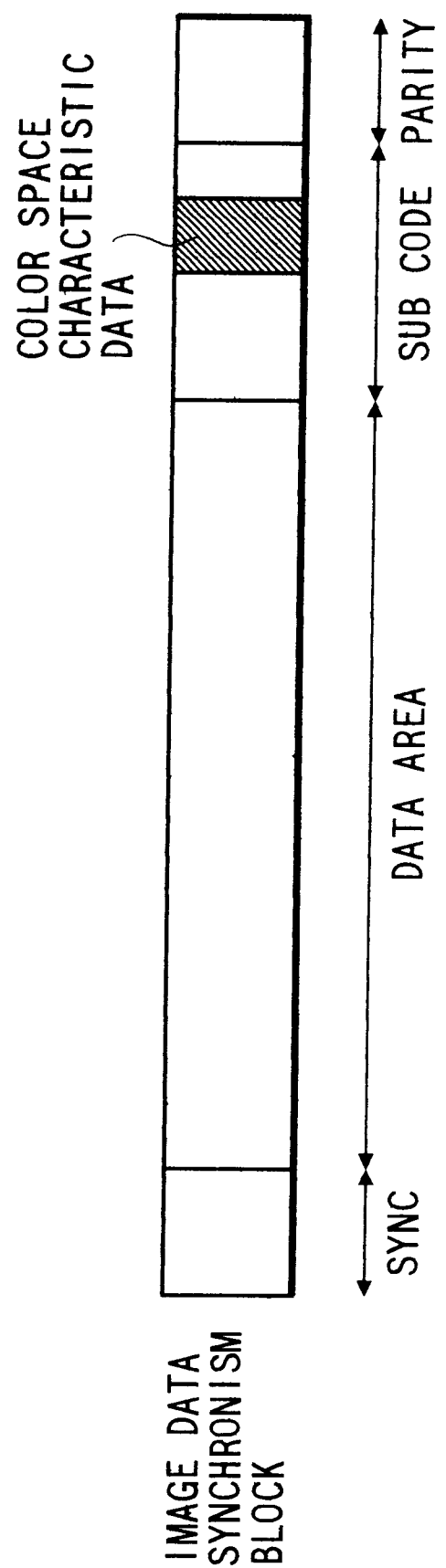
FIG. 5 is a view showing color space characteristic data multiplexed in a subcode area of image data.

On the transmission side, digital image data is supplied to a terminal 101, and color space characteristic data (i.e., profile data) representing the color space characteristic of the digital image data is supplied to a terminal 102. A data multiplexing circuit 103 multiplexes the color space characteristic data in the format of the digital image data. FIG. 5 shows an example of data multiplexing. In this example, the color space characteristic data is multiplexed in a sub-code area of the image data. An error correction coding circuit 104 adds parity data for correcting data errors on the transmission line to the multiplexed data. The data to be sent to the transmission line is subjected to pocketing and modulation by a transmission line coding circuit 105 and transmitted from a terminal 106.

On the reception side, a transmission line decoding circuit 108 decodes the transmitted data supplied from a terminal 107 and extracts a data block from the transmission packet. An error correction circuit 109 performs transmission line error correction processing. A data separation circuit 110 separates the color space characteristic data which is transmitted using the subcode area in the image data, as shown in the example of FIG. 5, and supplies the image data to a terminal 111 and the color space characteristic data to a terminal 112. In this manner, the transmitted image data and the corresponding color space characteristic data can be simultaneously obtained. Therefore, when CMS processing is performed on the reception side, processing based on optimum characteristic data can be performed.

Second Embodiment

Figure 6:
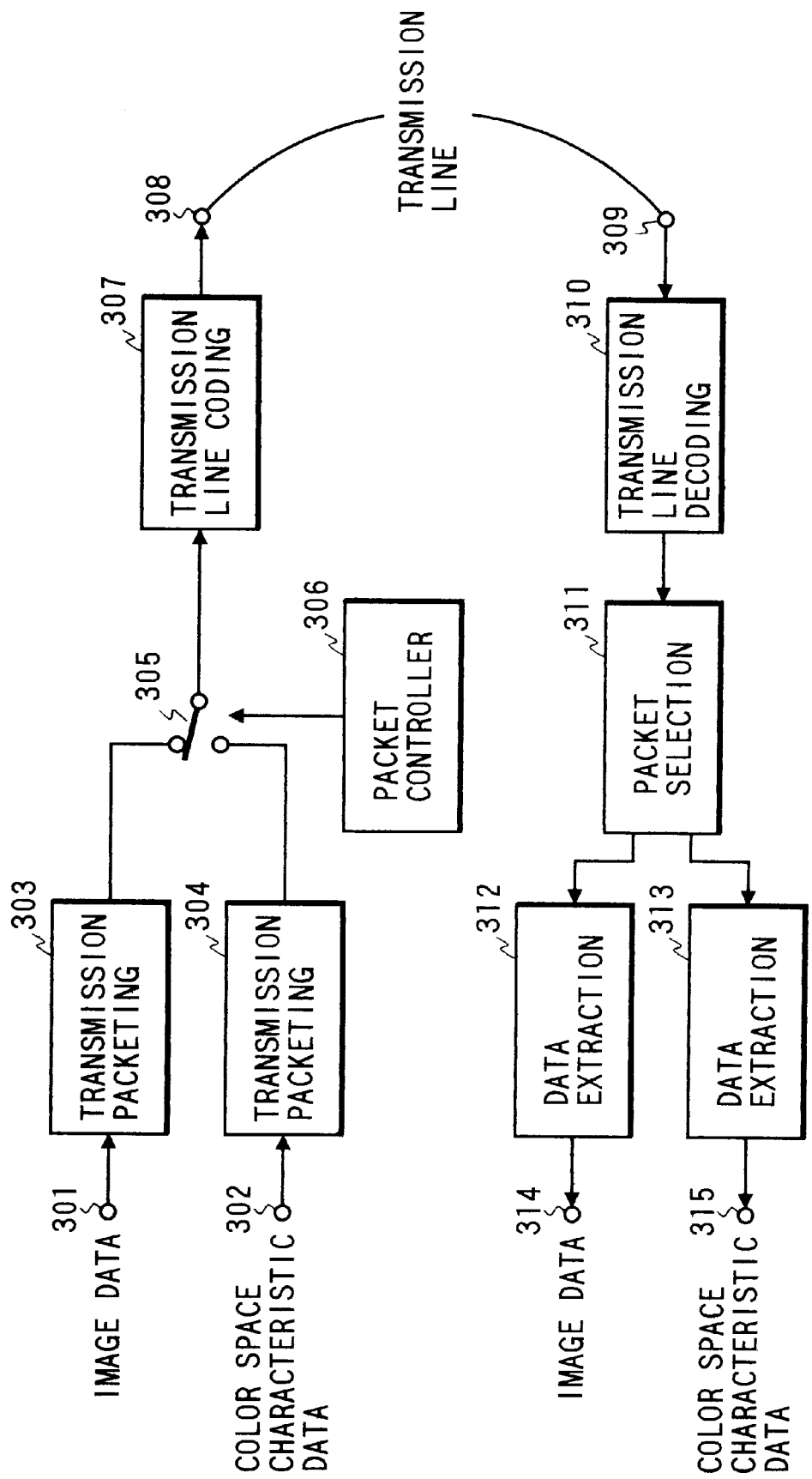
FIG. 6 is a block diagram showing an example in which color space characteristic data and image data are transmitted by different transmission packets.

FIG. 6 is a block diagram showing a digital image transmission scheme according to the second embodiment. On the transmission side, digital image data is supplied to a terminal 301, and color space characteristic data representing the color space characteristic of the digital image data is supplied to a terminal 302. Transmission packeting circuits 303 and 304 perform packeting processing for the respective data to be transmitted. The image data and color space characteristic data may be transmitted by different packet formats. In this embodiment, the transmission line is implemented by a serial bus based on a standard so called IEEE 1394 (to be referred to as a 1394-bus hereinafter). The packets are formed on the basis of the isochronous transfer scheme as a 1394-bus transfer scheme and the asynchronous transfer scheme. The packet of image data which has a large data amount is formed on the basis of the isochronous transfer scheme. The packet of color space characteristic data which has a small data amount and is occasionally transferred is formed on the basis of the asynchronous transfer scheme.

Figure 22:
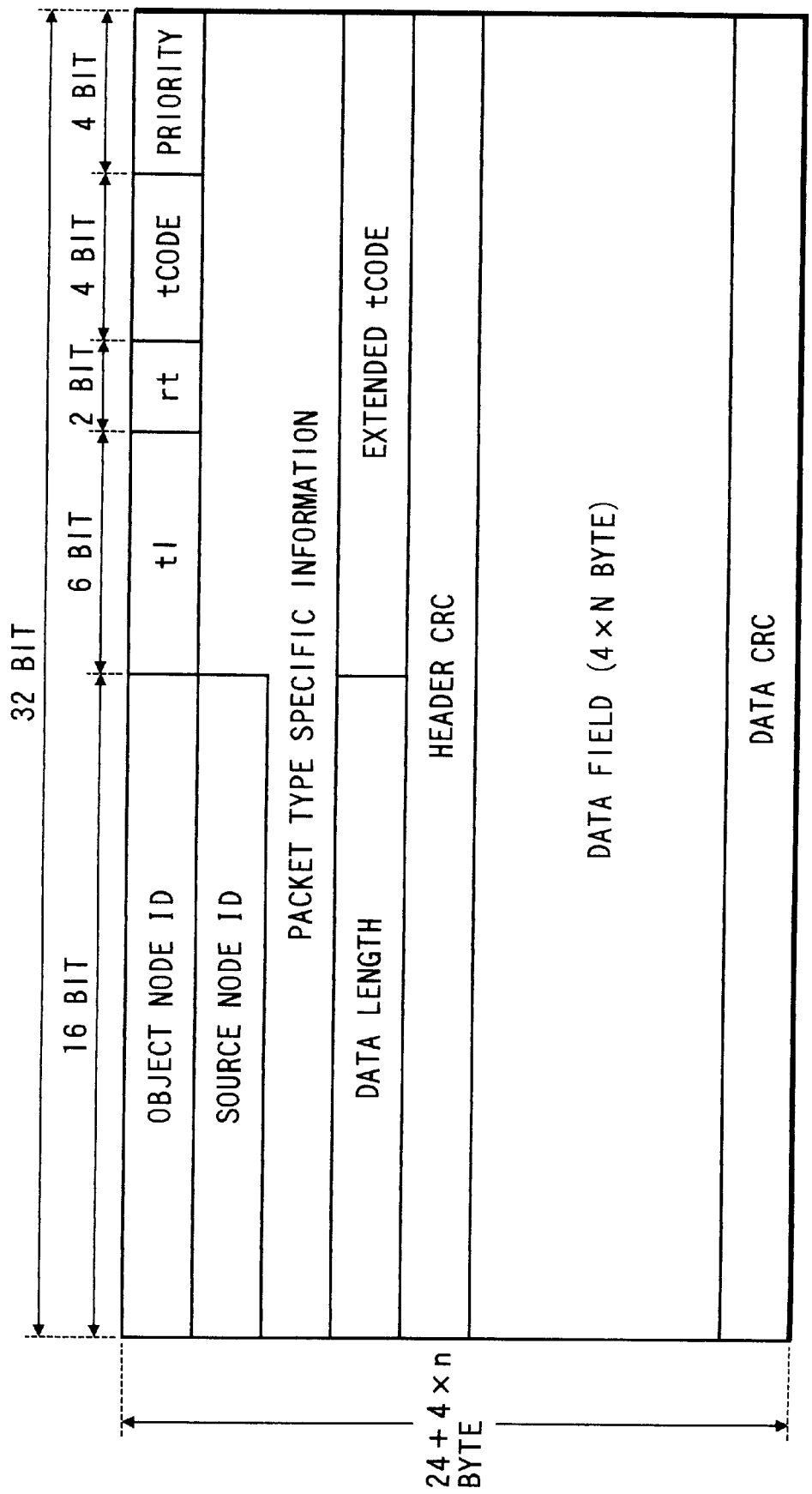
FIG. 22 is a view showing a packet format for asynchronous data transfer of the embodiment.
Figure 23:
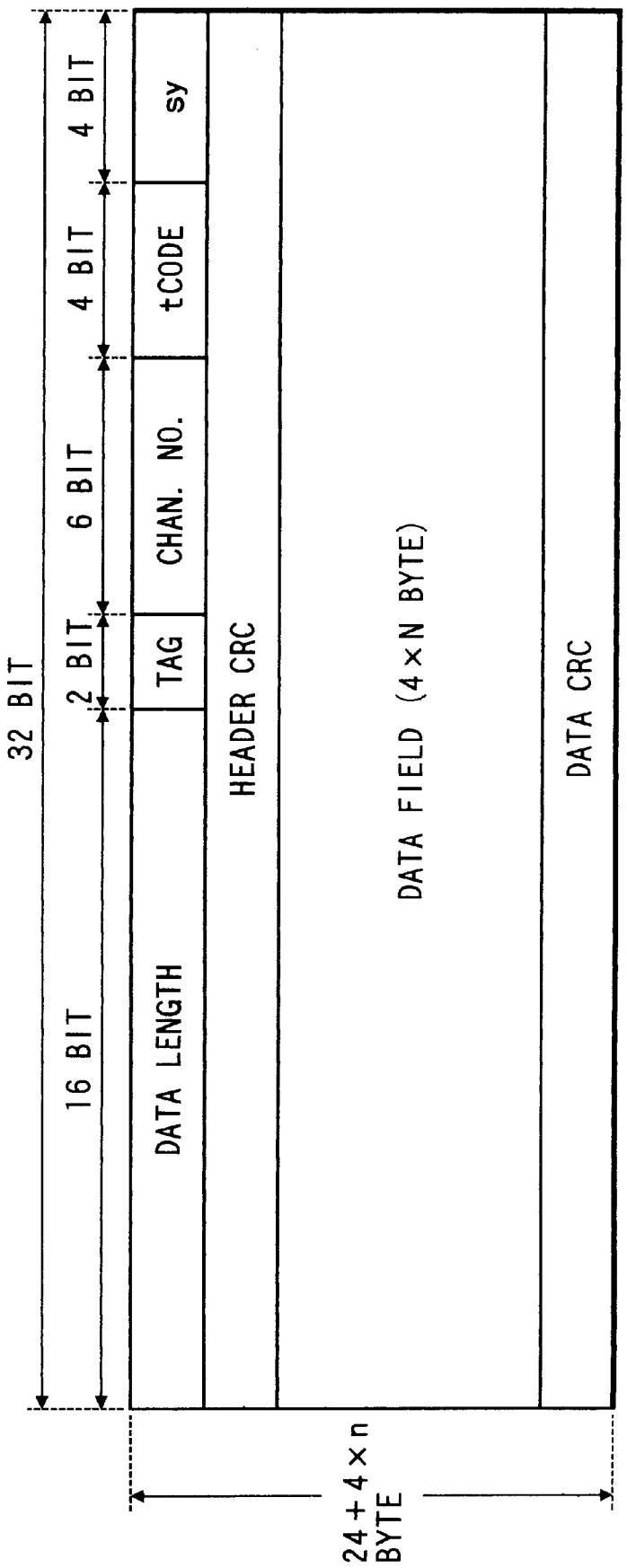
FIG. 23 is a view showing a packet format for isochronous data transfer of the embodiment.

FIG. 22 is a view showing the packet format of asynchronous transfer. FIG. 23 is a view showing the packet format of isochronous transfer.

An asynchronous packet has a data portion and an error correction data CRC as well as a header portion. As shown in FIG. 22, an object node ID, a source node ID, a transfer data length, various codes, and the like are written in the header portion of the packet to be transferred.

Isochronous packets are classified by assigned channel numbers. Each of the packets has a data portion and an error correction data CRC as well as a header portion. As shown in FIG. 23, a transfer data length, a channel number, various codes, the error correction header CRC, and the like are written in the header portion of the packet to be transferred.

The transmission packeting circuit 303 for image data forms a packet as shown in FIG. 23 while the transmission packeting circuit 304 for color space characteristic data forms a packet as shown in FIG. 22.

In other words, image data is packeted into the data field shown in FIG. 23 while color space characteristic data is packeted into the data field shown in FIG. 22.

The meanings of the respective fields shown in FIG. 22 will be described below.

object node ID: node ID number of the partner node
tl (transaction label): unique value indicating that the transaction is associated with the self node and the partner node
rt (retry): information associated with a retry method in a busy state
tCode: transaction code that defines the packet
priority: (area used by the application layer)
source node ID: ID number of the source node
packet type specific information: stores rCode (value representing whether the response is successful/unsuccessful) and the like (for a request packet, an address for outputting a read request)
data length: length of the data field
extended tCode: (records lower data of tCode)
header/data CRC: error correction CRC (only the header CRC in a request packet)
data field: isochronous data to be transferred (only in a response packet)

The meanings of the respective fields shown in FIG. 23 will be described below.

data length: defines the byte length of the data field subsequent to the header
TAG: designates the format of data transferred by isochronous transfer
channel No.: logical number assigned to packet data transfer
tCode: transaction code of this packet (in this case, isochronous transfer)
sy: value to exchange synchronous information dedicated to the transaction layer
header CRC: error correction CRC for the header (generated by the link layer)
isochronous data: isochronous data to be transferred
data CRC: error correction CRC for the data (generated by the link layer)

Figure 7:
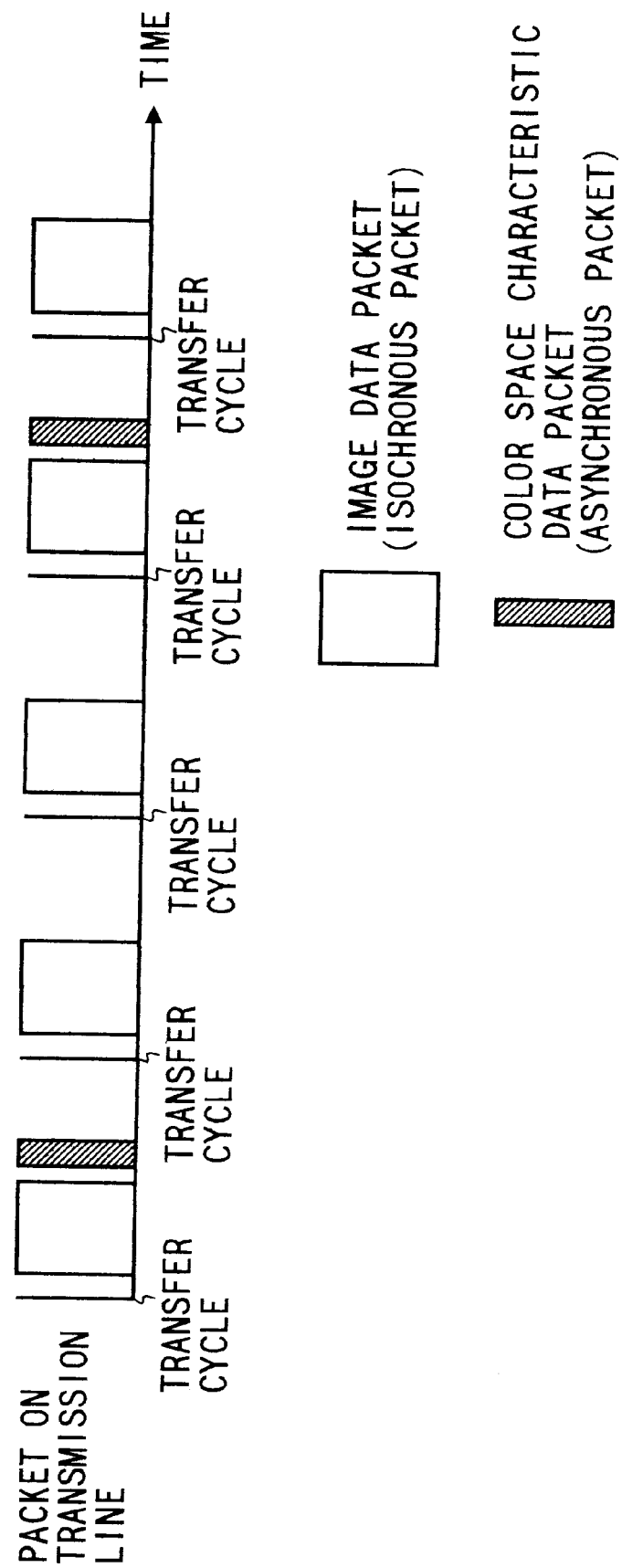
FIG. 7 is a view showing a packet multiplexed and sent onto a transmission line.

A packet controller 306 changes over a packet switch 305 in accordance with the respective data to be transmitted and the state of the transmission line, thereby multiplexing the image data packet and the color space characteristic data packet along the time axis. The multiplexing technique is based on the specifications of the 1394-bus, and multiplexing is performed such that the packet transition state as shown in FIG. 7 is exhibited in a predetermined isochronous cycle. A transmission line coding circuit 307 modulates the time-multiplexed packets to be sent to the transmission line and sends the packets from a terminal 308. FIG. 7 is a view showing an example of the packets which are multiplexed and sent to the transmission line.

On the reception side, a transmission line decoding circuit 310 decodes the transmitted data supplied from a terminal 309. The image data packet and the color space characteristic data packet are sorted by a packet selection circuit 311 and supplied to data extraction circuits 312 and 313, respectively. The data extraction circuits 312 and 313 extract data from the transmitted packets. The image data is supplied to a terminal 314, and the color space characteristic data is supplied to a terminal 315.

Third Embodiment

Figure 8:
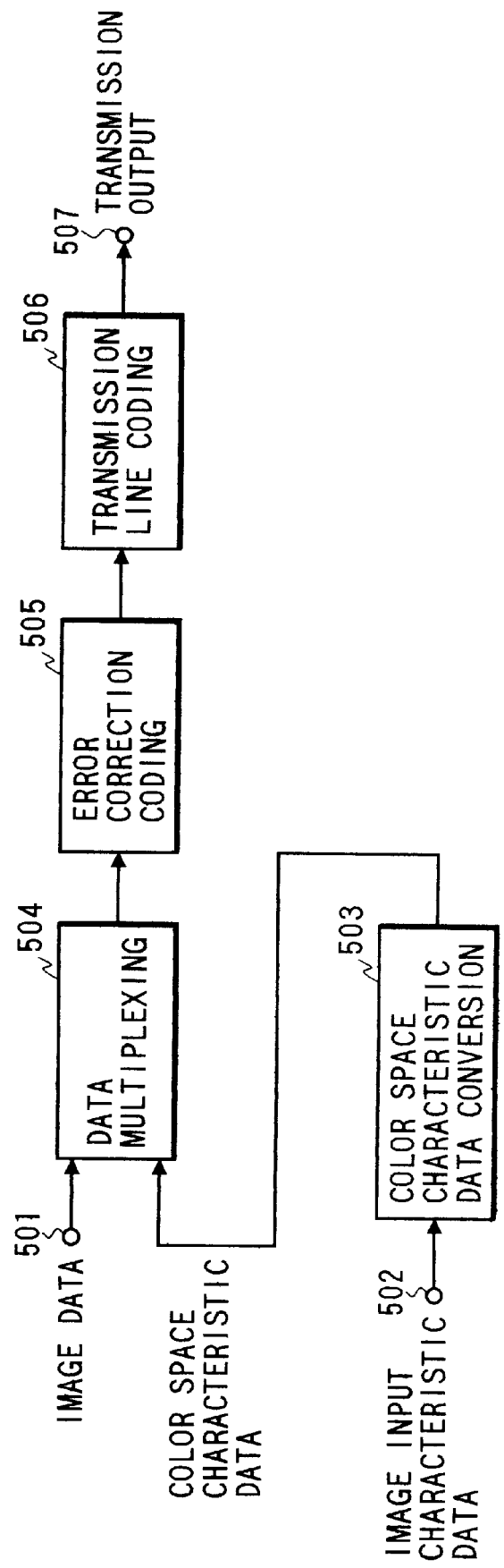
FIG. 8 is a block diagram showing a transmission-side configuration for selecting color space characteristic data in accordance with the input characteristic of image data and transmitting the color space characteristic data.

FIG. 8 is a transmission-side configuration for selecting color space characteristic data in accordance with the input characteristic of image data and transmitting the color space characteristic data. Digital image data is supplied to a terminal 501, and the input characteristic of the digital image data is supplied to a terminal 502. The image input characteristic data is, e.g., the adjustment information of the input device, such as the white balance, AE, or gamma data of a video camera, measurement information based on external measurement by a colorimetry device or the like, or image pickup information which is manually designated by the user. Alternatively, characteristic data based on the type of output device, e.g., the video camera, in which all of these information are combined, may be used.

The image input characteristic data is converted into color space characteristic data as described above by a color space characteristic data conversion circuit 503. A data multiplexing circuit 504 multiplexes the color space characteristic data in the format of the digital image data by using a subcode area as shown in FIG. 5. An error correction coding circuit 505 adds parity data for correcting data errors on the transmission line to the multiplexed data. The data to be sent onto the transmission line is subjected to pocketing and modulation by a transmission line coding circuit 506 and transmitted from a terminal 507.

Figure 9:
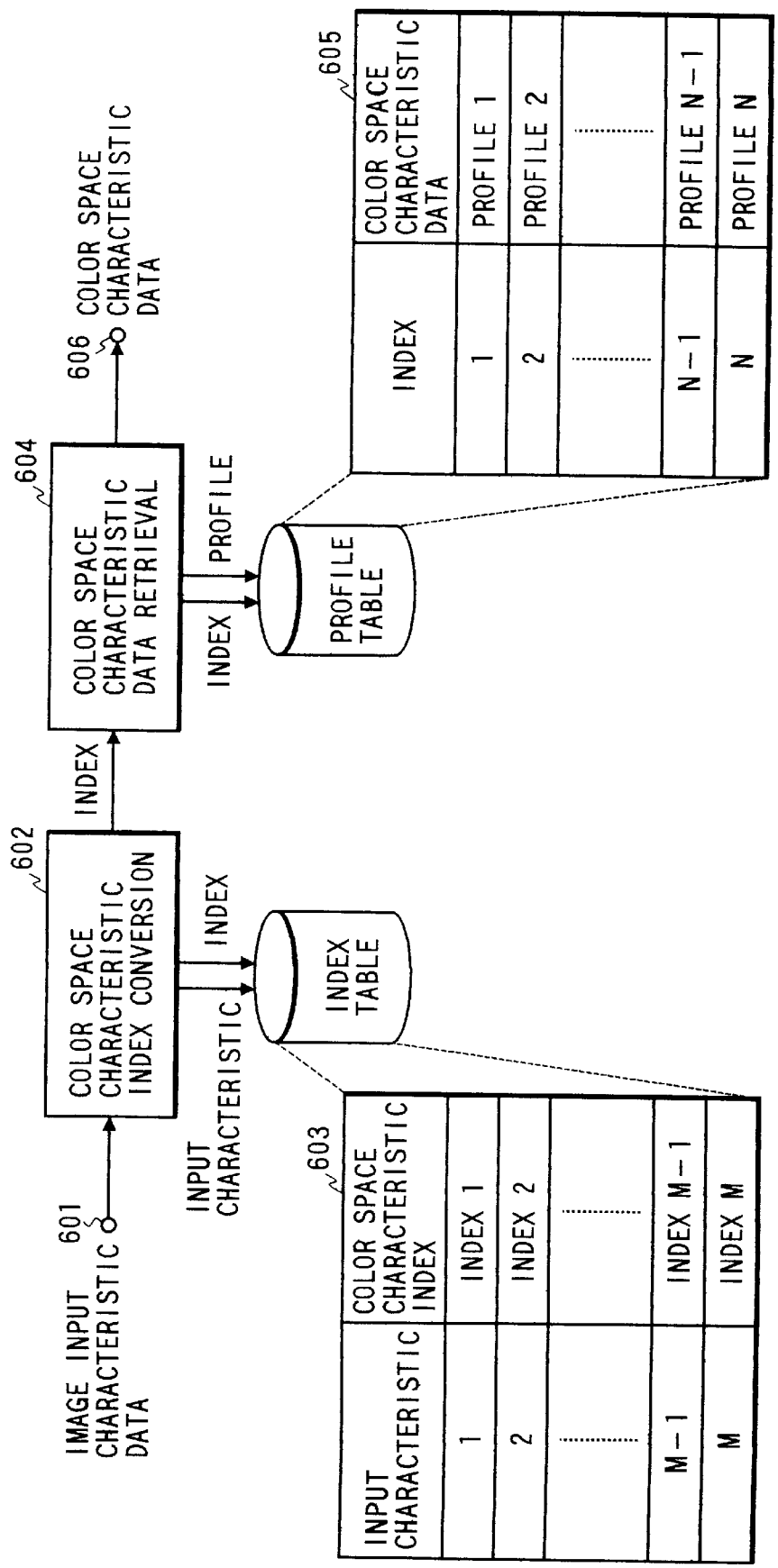
FIG. 9 is a view showing conversion from image input characteristic data into color space characteristic data.

Conversion from the image input characteristic data into the color space characteristic data by the color space characteristic data conversion circuit 503 can be performed on the basis of a map which uses a function representing the characteristic of the input device. FIG. 9 is a view showing an example in which, to simplify the circuit arrangement, a table prepared in advance is used. Image input characteristic data input from a terminal 601 is converted by a color space characteristic INDEX conversion circuit 602 into an INDEX which is used to retrieve color space characteristic data.

This INDEX has a number assigned to the image input characteristic data in correspondence with the color space characteristic data which has been measured in advance. In this embodiment, conversion into an INDEX is performed using an index table 603 corresponding to input characteristics. However, in an input system capable of approximating the image input characteristic data by simple threshold processing, the color space characteristic INDEX conversion circuit 602 can be constituted using a threshold circuit. In accordance with an INDEX supplied from the color space characteristic INDEX conversion circuit 602, a color space characteristic data retrieval circuit 604 retrieves, from a profile table 605, color space characteristic data which has been measured in advance. The color space characteristic data is output from a terminal 606.

Figures 10, 11:
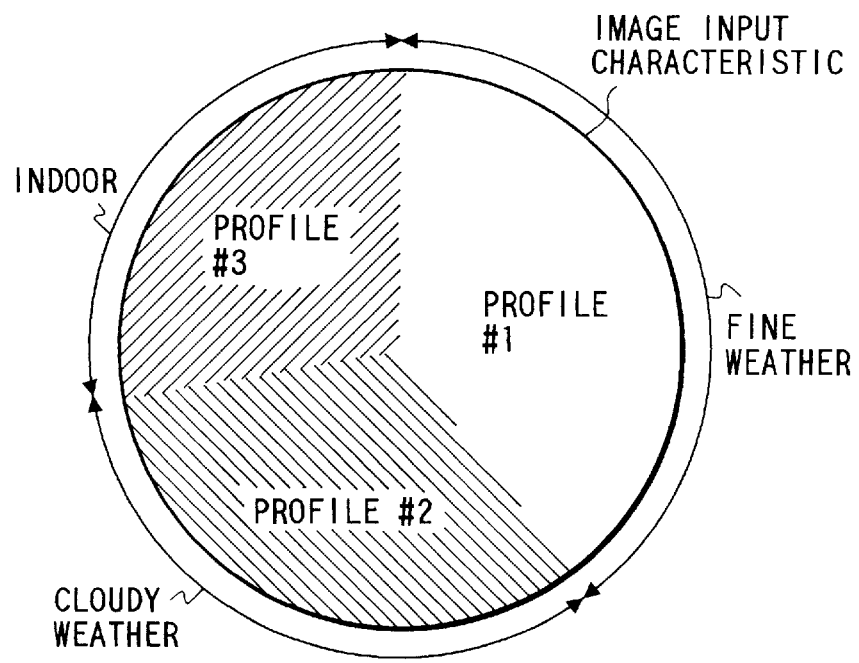
FIG. 10 is a view showing conversion of input data within a certain range into identical color space characteristic data.
FIG. 11 is a view of an INDEX Table for outputting an identical INDEX in correspondence with input characteristics within a certain range.

A number (range) M of input characteristics to be processed need not always equal a number N of color space characteristic data after conversion. Input characteristics within a certain range can be converted into identical color space characteristic data, thereby reducing the number of profiles and the data amount of the profile table. For example, in FIG. 10, an image input characteristic data range corresponding to "fine weather" is converted into "Profile #1". Similarly, "cloudy weather" is converted into "Profile #2", and "indoor" is converted into "Profile #3". With this processing, characteristics for largely different image pickup conditions can be corrected by three color space characteristic data. This processing can be realized by, in the index table 603 shown in FIG. 9, outputting an identical INDEX in correspondence with input characteristics within a certain range, and storing corresponding color space characteristic data in the profile table 605, as shown in FIG. 11.

Figure 12:
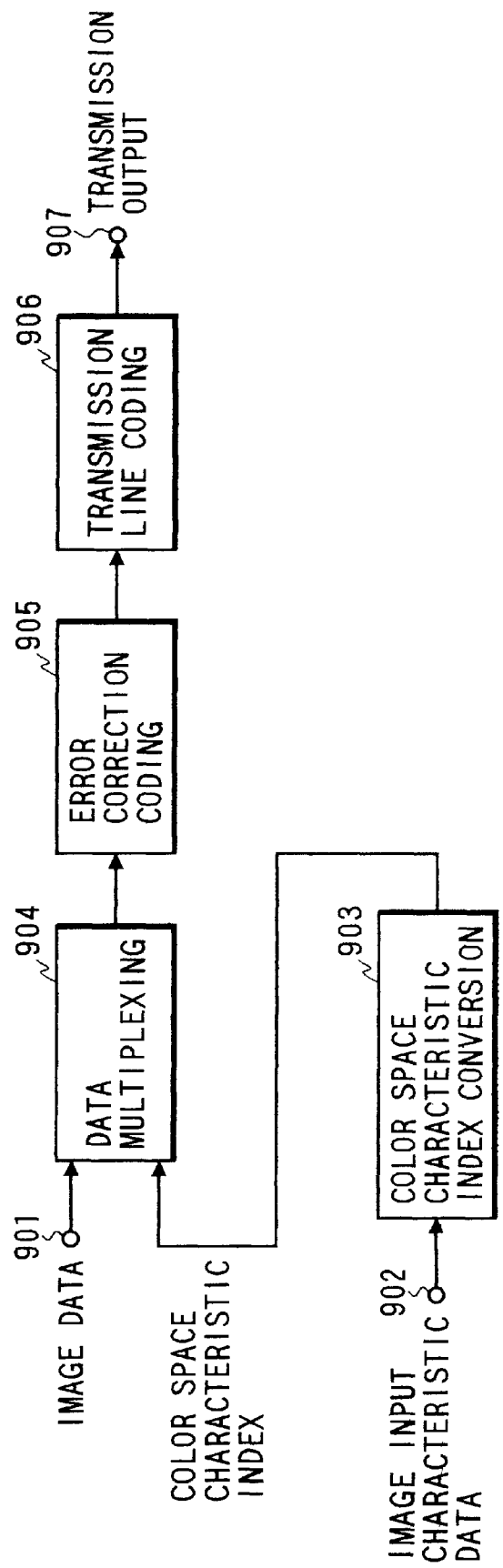
FIG. 12 is a block diagram showing an example in which a color space characteristic INDEX is multiplexed in image data and transmitted.
Figure 16:
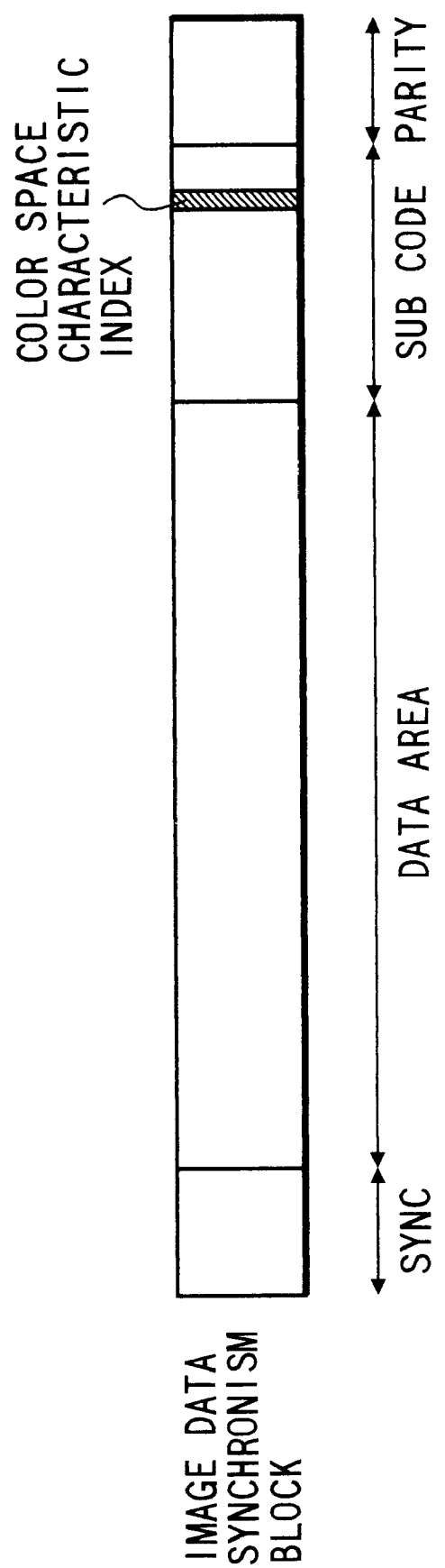
FIG. 16 is a view showing a color space characteristic INDEX multiplexed in a subcode area of image data.

FIG. 12 is a block diagram showing an example in which, instead of color space characteristic data, a color space characteristic INDEX is multiplexed in image data and transmitted. Digital image data is supplied to a terminal 901, and the input characteristic data of the digital image data is supplied to a terminal 902. The image input characteristic data is converted into a color space characteristic INDEX as described above by a color space characteristic INDEX conversion circuit 903. A data multiplexing circuit 904 multiplexes the color space characteristic INDEX in the format of the digital image data by using a subcode area, as shown in FIG. 16. An error correction coding circuit 905 adds parity data for correcting data errors on the transmission line to the multiplexed data. The data to be sent onto the transmission line is subjected to packeting and modulation by a transmission line coding circuit 906 and transmitted from a terminal 907.

Figure 13:
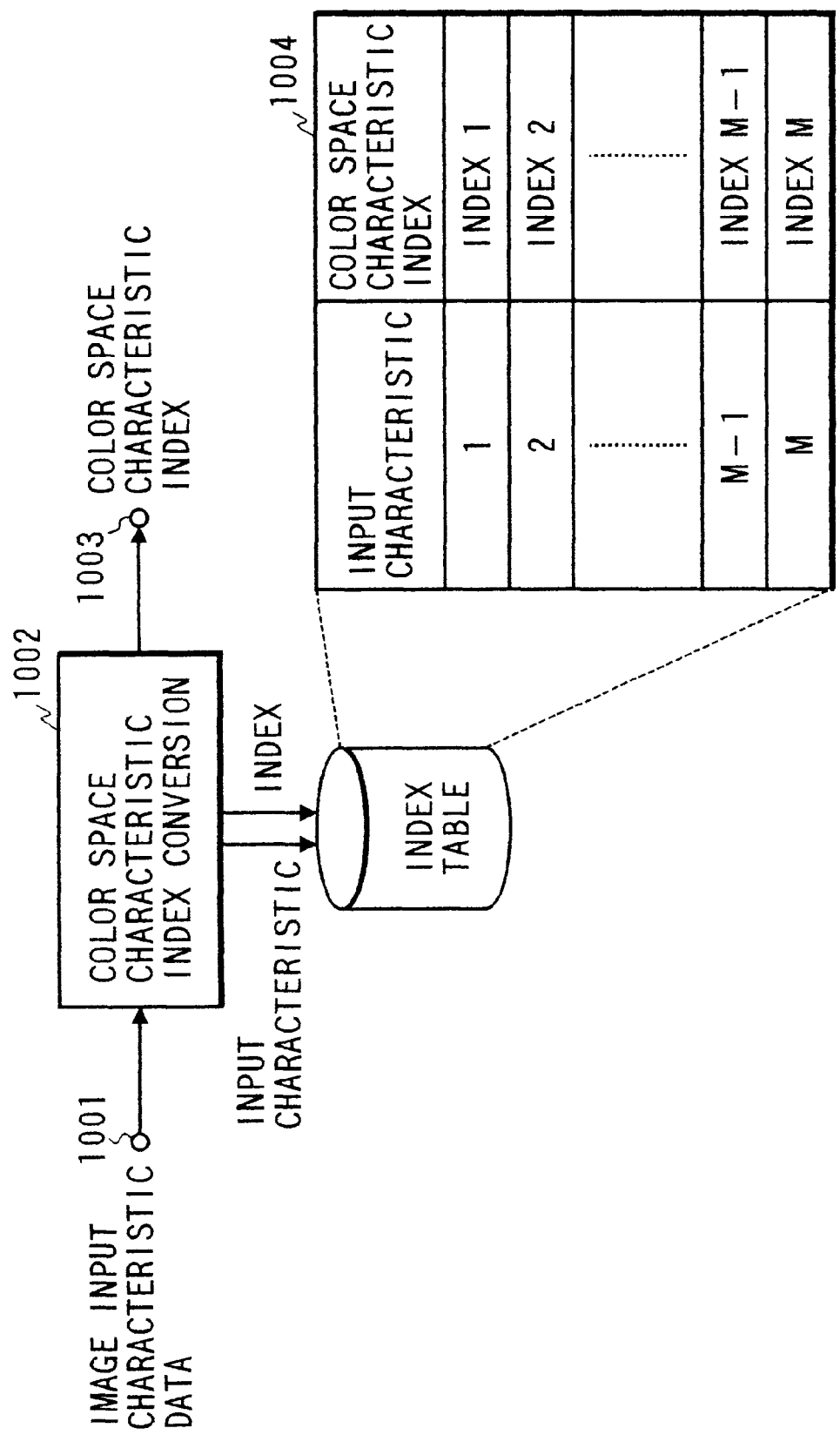
FIG. 13 is a view showing conversion from image input characteristic data into a color space characteristic INDEX.

Conversion from the image input characteristic data into the color space characteristic INDEX by the color space characteristic INDEX conversion circuit 903 can be performed on the basis of a map which uses a function representing the characteristic of the input device. FIG. 13 is a view showing an example in which, to simplify the circuit arrangement, a table prepared in advance is used. Image input characteristic data input from a terminal 1001 is converted by a color space characteristic INDEX conversion circuit 1002 into an INDEX which is used to retrieve color space characteristic data, and output from a terminal 1003. This INDEX has a number assigned to the image input characteristic data in correspondence with the color space characteristic data which has been measured in advance and prepared on the reception side. In this embodiment, conversion is performed using an INDEX Table 1004 corresponding to input characteristics. However, in an input system capable of approximating the image input characteristic data by simple threshold processing, the color space characteristic INDEX conversion circuit 1002 can be constituted using a threshold circuit.

Figure 14:
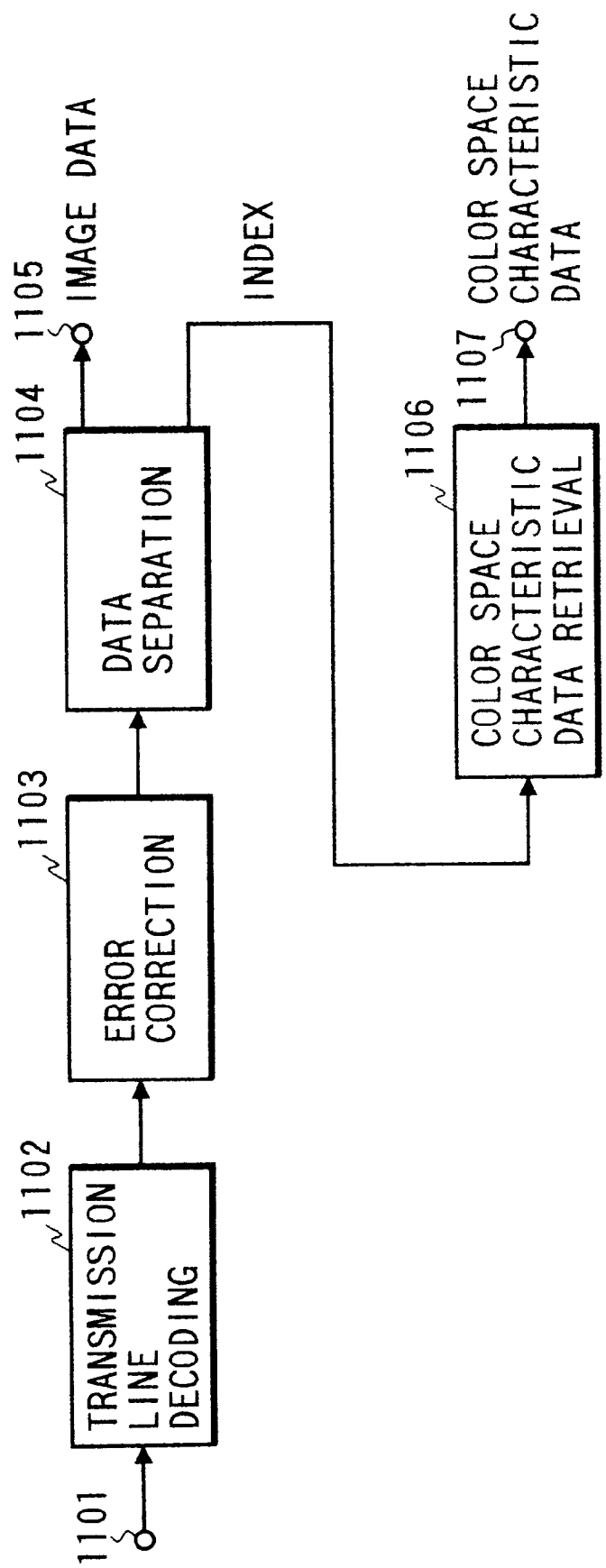
FIG. 14 is a block diagram showing a configuration for receiving a multiplexed color space characteristic INDEX.
Figure 15:
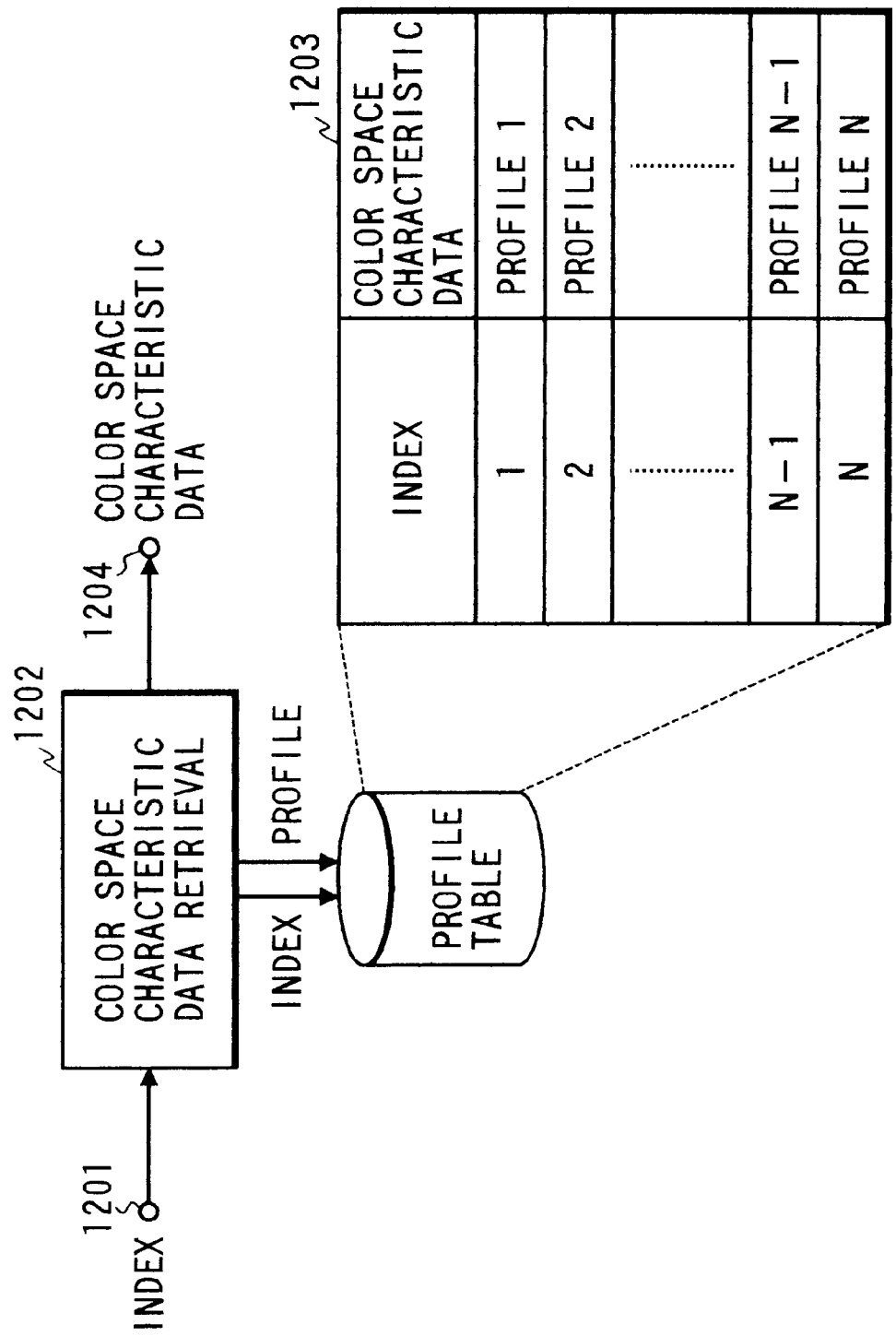
FIG. 15 is a view showing conversion from the color space characteristic INDEX into color space characteristic data.

FIG. 14 is a block diagram showing a reception-side configuration. A transmission line decoding circuit 1102 decodes the transmitted data supplied from a terminal 1101 and extracts a data block from the transmitted packet. An error correction circuit 1103 performs transmission line error correction processing. A data separation circuit 1104 separates the color space characteristic INDEX which is transmitted using the subcode area in the image data, as shown in the example of FIG. 16, and supplies the image data to a terminal 1105 and the color space characteristic INDEX to a color space characteristic data retrieval circuit 1106. The color space characteristic data retrieval circuit 1106 retrieves, from a profile table 1203, the color space characteristic data which has been measured in advance and outputs the color space characteristic data from a terminal 1107, as shown in FIG. 15.

Figure 17:
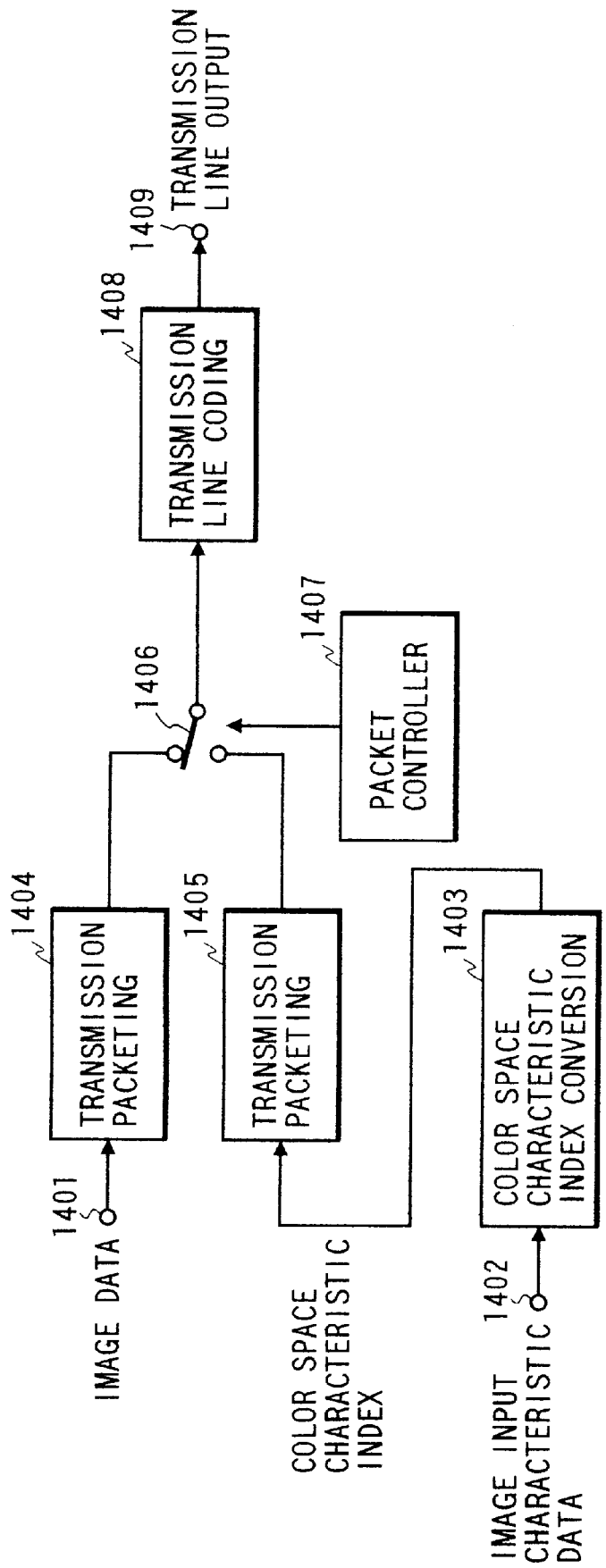
FIG. 17 is a block diagram showing an example in which a color space characteristic INDEX and image data are transmitted by different transmission packets.
Figure 18:
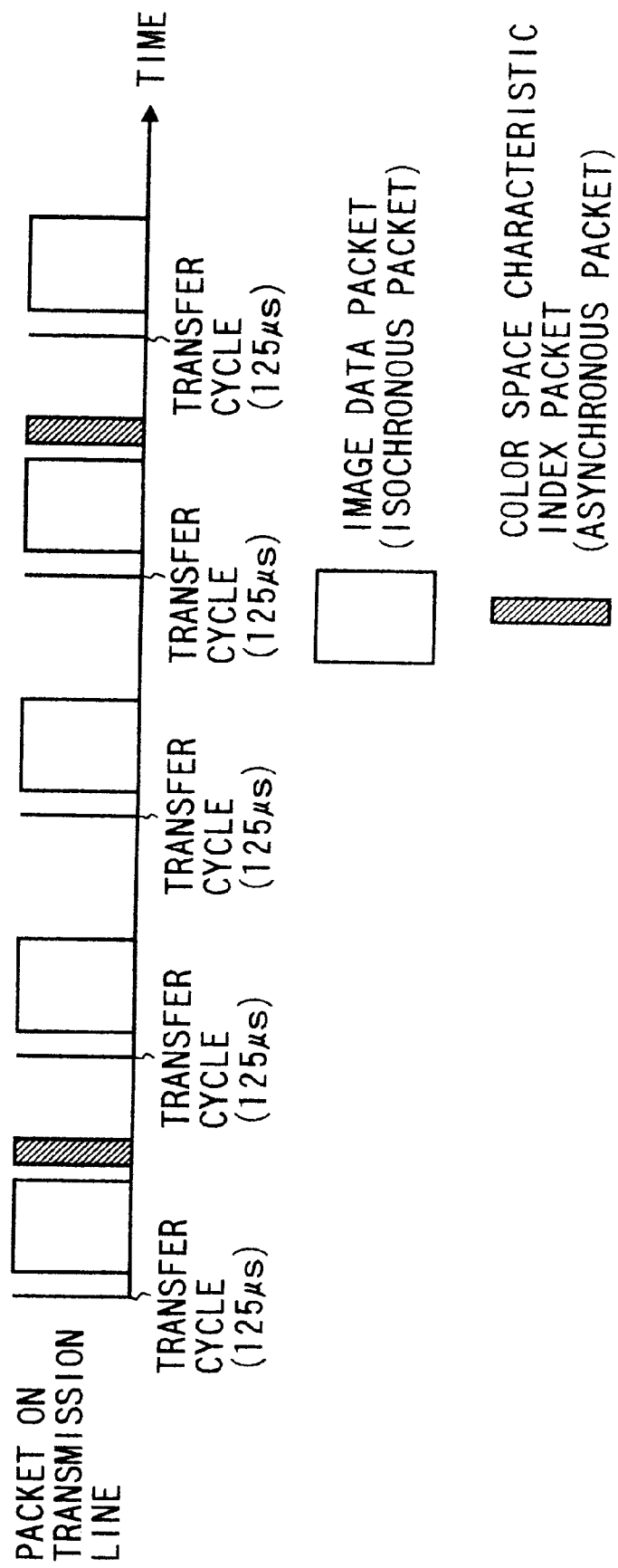
FIG. 18 is a view showing a packet multiplexed and sent onto a transmission line.

FIG. 17 is a block diagram showing an example in which a color space characteristic INDEX and image data are transmitted by different transmission packets. Digital image data is supplied to a terminal 1401, and the input characteristic data of the digital image data is supplied to a terminal 1402. The image input characteristic data is converted into a color space characteristic INDEX as described above by a color space characteristic INDEX conversion circuit 1403. Transmission pocketing circuits 1404 and 1405 perform packeting processing according to the 1394 standard to transmit the respective data. The image data and the color space characteristic INDEX may be transmitted by different packet formats. In this example, the packet of the image data is formed on the basis of the above-described isochronous transfer scheme, and the packet of the color space characteristic INDEX is formed on the basis of the asynchronous transfer scheme. A packet controller 1407 changes over a packet switch 1406 in accordance with the amounts of the respective data to be transmitted and the state of the transmission line. The image data packet and the color space characteristic INDEX packet are multiplexed on the basis of the specifications of the 1394-bus such that the packet transition state as shown in FIG. 18 is exhibited in a predetermined isochronous cycle. A transmission line coding circuit 1408 modulates the time-multiplexed packets to be sent to the transmission line and sends the packets from a terminal 1409. FIG. 18 is a view showing an example of the packets which are multiplexed and sent onto the transmission line. On the reception side, sorting of the packets and data extraction are performed, as described above in the example of FIG. 6. Thereafter, the obtained color space characteristic INDEX is converted into color space characteristic data by using a color space characteristic data retrieval circuit 1202 shown in FIG. 12, thereby reproducing the color space characteristic data corresponding to the received image data.

The color space characteristic INDEX to be selected may be information with a hierarchical structure in which the upper layer is constituted by a profile group corresponding to the types of devices, e.g., a video camera, and the lower layer is constituted by color space characteristic INDEX corresponding to the respective types of devices. In this case, the information associated with the type is transferred from the video camera to the host computer by asynchronous transfer. After the type (profile group) is selected and fixed, INDEX data in the information is multiplexed in the image data and transmitted by isochronous transfer. With this configuration, more faithful CMS processing can be performed.

When image data recorded on a tape is to be output, image pickup information stored in a subcode area of the tape is transmitted to the PC together with the image data in reproduction processing.

In this case, the type of player may be different from that in the image pickup operation. Hence, basically, the subcode information recorded on the tape is used to obtain the color space characteristic.

Fourth Embodiment

CMS processing for moving picture data will be described below as the fourth embodiment with reference to the accompanying drawings.

Figure 19:
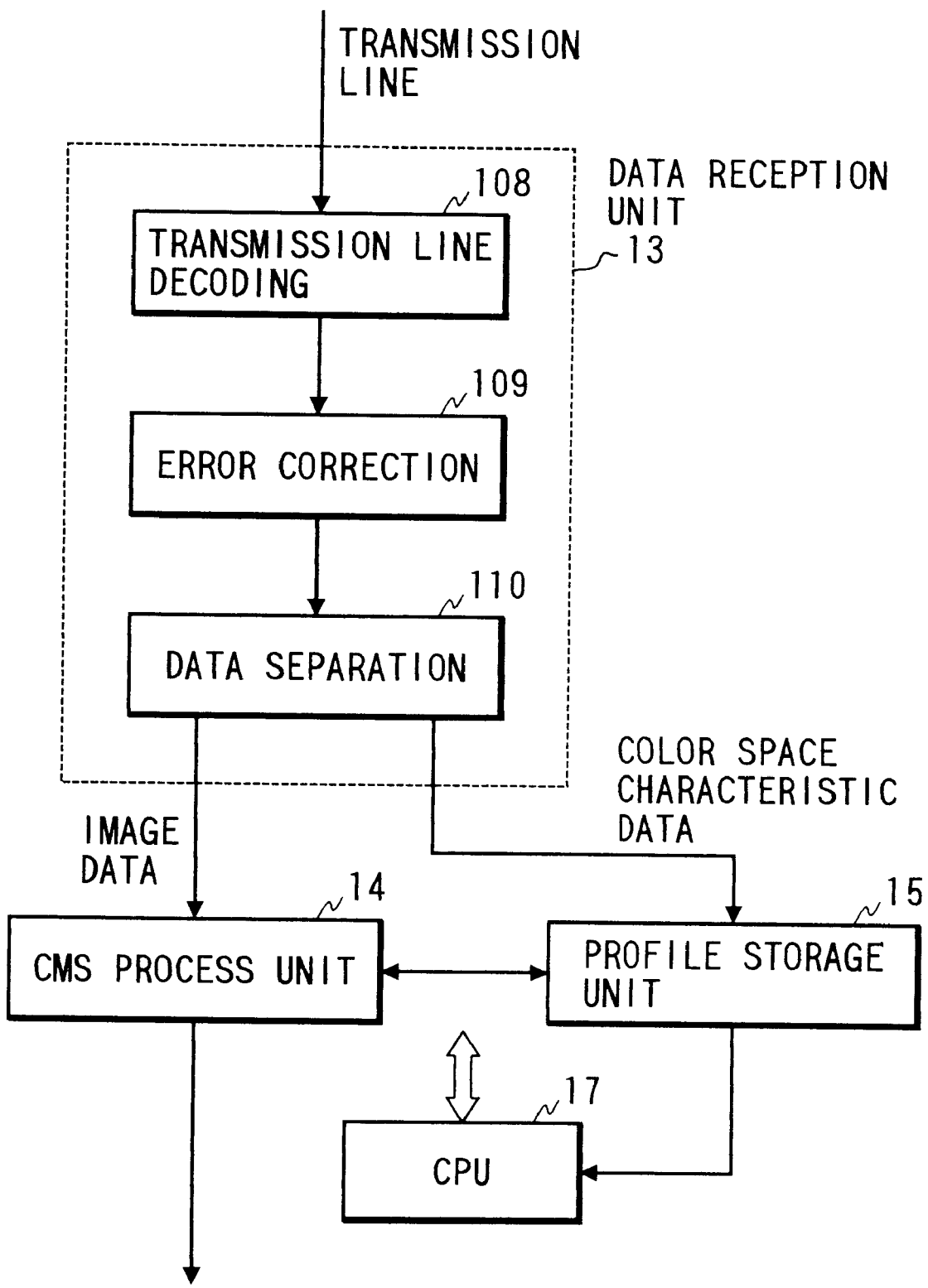
FIG. 19 is a block diagram showing the configuration of a host computer for processing moving picture data.

In this embodiment, FIG. 19 shows a configuration for multiplexing color space characteristic data in a subcode area as shown in the first embodiment. The configuration may be applied to packet transmission as shown in the second embodiment, as a matter of course.

Figure 20:
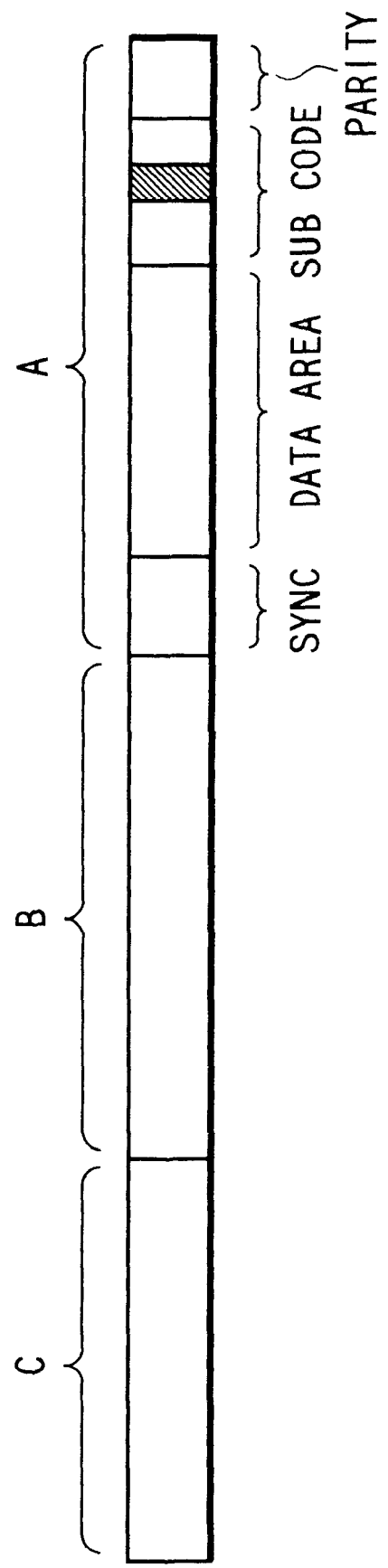
FIG. 20 is a view showing the structure of the moving picture data.
Figure 21:
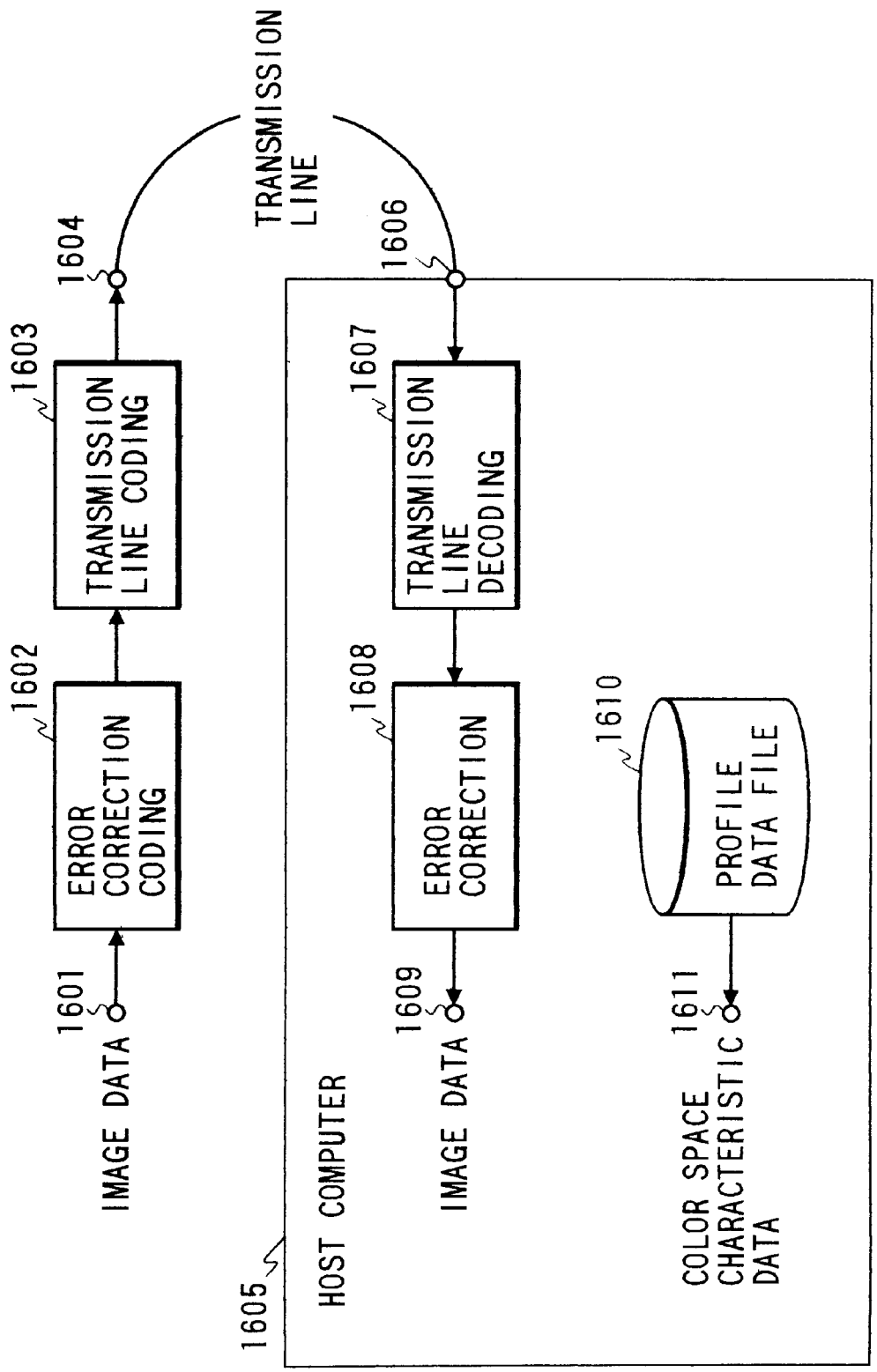
FIG. 21 is a block diagram showing the relationship between an image transmission technique and a CMS in the prior art.

As shown in FIG. 20, moving picture data is constituted by continuously connecting image data synchronous blocks shown in FIG. 5.

In this embodiment, the color space characteristic data is added as a subcode to each block.

The moving picture data is separated into an image data block and the color space characteristic data by a data reception unit 13 constituted by a transmission line decoding circuit 110, an error correction circuit 109, and a data separation circuit 110.

The color space characteristic data is stored in a profile storage unit 15 as a profile corresponding to the input image data. A CMS process unit 14 performs input device corresponding CMS processing by using the stored profile as an input profile and also performs output device corresponding CMS processing corresponding to a predetermined output device.

Since the target image data is moving picture data, the color space characteristic data may change during the image pickup operation due to scene change or the like. Therefore, a CPU 17 determines whether the color space characteristic data separated in units of blocks is different from the color space characteristic data added to the previous block. If the color space characteristic data has changed, the color space characteristic data is stored in the profile storage unit 15 as an input profile, and the input device corresponding CMS processing is shifted to CMS processing using this input profile.

As described above, according to this embodiment, CMS processing can be performed in real time in correspondence with changes in color space characteristic data during the image pickup operation of moving picture data.

Figure 2:
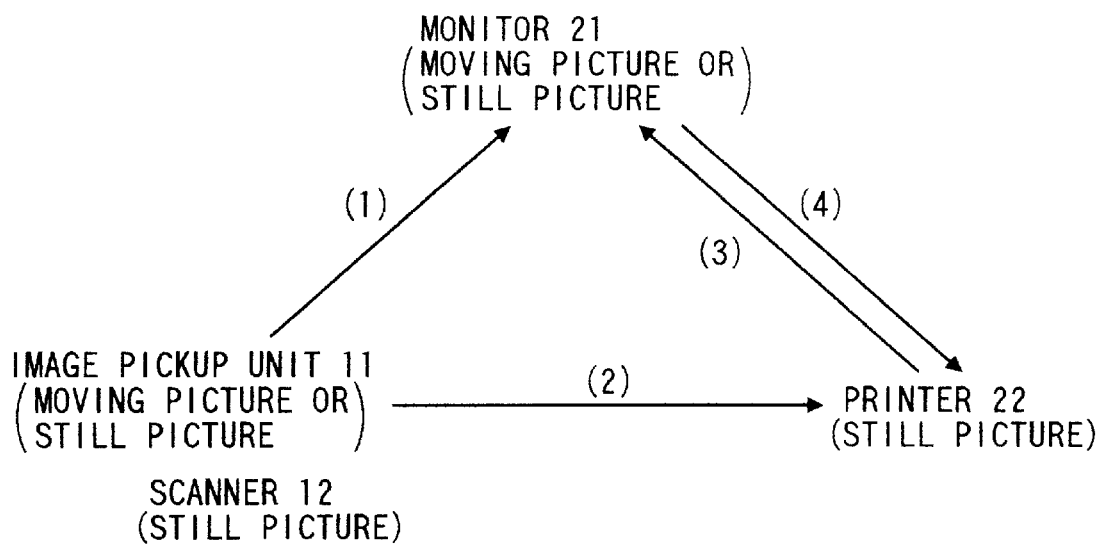
FIG. 2 is a view showing combinations of input and output devices in CMS processing.

The CMS process unit 14 constituted by an input device corresponding CMS process unit 23 and an output device corresponding CMS process unit 24 as shown in FIG. 2 can cope with scene change by changing only the input device corresponding CMS processing on the basis of the change in color space characteristic data added in units of blocks without changing the output device corresponding CMS processing.

The color space characteristic data may be added not in units of blocks but to only a block whose characteristic has changed.

The profile in each of the above embodiments may be either data representing a transform function such as a 3×3 matrix or table data. The profile may be based on a desired standard such as Inter Color Profile, as a matter of course.

According to the above embodiments, a color space conversion characteristic suitable for each particular image data can always be provided.

In addition, according to the above embodiments, a profile suitable for each specific image pickup condition can be selected.

Furthermore, according to the above embodiments, a reproduced image whose colors match those of a moving picture can be obtained.

The process procedures of the above embodiments may be implemented by a computer.

In this case, the present invention also incorporates a case in which the process procedures are stored, in a medium, as a program readable by a computer in advance, and the program is read out by the computer. The medium may be a ROM, a RAM, or a disk readable by a computer.

What is claimed is:

1. An image processing uprights comprising:
   transfer means for transferring digital color image data representing a desired image input by image input means and having a color space depending on said image input means; and
   extraction means for extracting a color space conversion characteristic used to convert the color space depending on said image input means into another color space,
   wherein said transfer means transfers the digital color image data having the color space depending on said image input means and the color space conversion characteristic, and
   wherein said transfer means has asynchronous transfer means and isochronous transfer means.

2. An apparatus according to claim 1, wherein said transfer means transfers the digital color image data to image processing means for performing color matching processing for the digital color image data in response to the color space conversion characteristic.

3. An apparatus according to claim 1, wherein the color space conversion characteristic is added in subcode information of the digital color image data and transferred.

4. An apparatus according to claim 1, wherein the color space conversion characteristic is multiplexed along a time axis and transferred as data different from the digital color image data.

5. An apparatus according to claim 1, further comprising compression/coding means for compressing/coding the digital color image data.

6. An apparatus according to claim 5, wherein the digital color image data is subjected to compression/coding processing, and the color space conversion characteristic is not subjected to compression/coding processing.

7. An apparatus according to claim 1, wherein the color space conversion characteristic is transferred using said asynchronous transfer means.

8. An image processing apparatus comprising:
   storage means for storing a plurality of profiles corresponding to a plurality of image pickup conditions;
   input means for inputting an image pickup condition which is set when a desired image is obtained;
   selection means for selecting a profile suitable for the image pickup condition from the plurality of stored profiles; and
   transfer means for transferring image data representing the desired image in correspondence with the selected profile,
   wherein said transfer means has asynchronous transfer means and isochronous transfer means.

9. An apparatus according to claim 8, wherein the image pickup condition is measurement information which is measured by an external measurement unit of said image pickup means when the desired image is picked up.

10. An apparatus according to claim 8, wherein the image pickup condition is adjustment information which is obtained when the desired image is picked up by said image pickup means.

11. An apparatus according to claim 10, wherein the adjustment information is information associated with white balance.

12. An apparatus according to claim 8, wherein the image pickup condition is image pickup information which is manually designated by a user when the desired image is picked up by said image pickup means.

13. An apparatus according to claim 8, wherein the plurality of profiles stored in said storage means correspond to image pickup environments.

14. An apparatus according to claim 13, wherein the image pickup environments are weather conditions.

15. An apparatus according to claim 8, wherein the color space conversion characteristic is transferred using said asynchronous transfer means.

16. An image processing method in which digital color image data is transferred to a reception device having storage means for storing a plurality of profiles corresponding to image pickup conditions in correspondence with index information, comprising the steps of:
   transferring by transfer means the digital color image data representing a desired image picked up by image pickup means and having a color space depending on said image pickup means;
   selecting a color space conversion characteristic used to convert the color space depending on said image pickup means into another color space in response to the desired image; and
   transferring by said transfer means the digital color image data having the color space depending on said image pickup means and index information representing the selected color space conversion characteristic,
   wherein said transfer means has asynchronous transfer means and isochronous transfer means.

17. An image processing method comprising the steps of:
   storing a plurality of profiles corresponding to desired image pickup conditions;
   inputting an image pickup condition which is set when a desired image is obtained;
   selecting a profile suitable for the image pickup condition from the plurality of stored profiles;
   performing color matching processing for the desired image by using the selected profile; and
   transferring by a transfer means image data representing the desired image in correspondence with the selected profile,
   wherein said transfer means has asynchronous transfer means and isochronous transfer means.

18. A method according to claim 17, wherein each step is performed using a medium which is readable by a computer.

19. A storage medium storing a computer readable program for controlling an image processing method in which digital color image data is transferred to a reception device having storage means for storing a plurality of profiles corresponding to image pickup conditions in correspondence with index information, the program comprising the steps of:
   transferring by transfer means the digital color image data representing a desired image picked up by image pickup means and having a color space depending on said image pickup means;
   selecting a color space conversion characteristic used to convert the color space depending on said image pickup means into another color space in response to the desired image; and
   transferring by said transfer means the digital color image data having the color space depending on said image pickup means and index information representing the selected color space conversion characteristic,
   wherein said transfer means has asynchronous transfer means and isochronous transfer means.

20. A storage medium storing a computer readable program for controlling an image processing method comprising the steps of:

storing a plurality of profiles corresponding to desired image pickup conditions;

inputting an image pickup condition which is set when a desired image is obtained;

selecting a profile suitable for the image pickup condition from the plurality of stored profiles;

performing color matching processing for the desired image by using the selected profile; and transferring by a transfer means image data representing the desired image in correspondence with the selected profile, wherein said transfer means has asynchronous transfer means and isochronous transfer means.

* * * * *

UNITED STATES PATENT AND TRADEMARK OFFICE
CERTIFICATE OF CORRECTION

PATENT NO.    : 5,982,416
DATED         : November 9. 1999
INVENTOR(S)   : YOSHIKI ISHII ET AL.

It is certified that error appears in the above-identified patent and that said Letters Patent is hereby corrected as shown below:

<u>IN SHEET 2</u>

Figure 3, "PRIFILE" should read --PROFILE--.

<u>COLUMN 7</u>

Line 32, "these" should read --these kinds of--.

<u>COLUMN 11</u>

Line 5, "uprights" should read --apparatus--.

Signed and Sealed this

Twenty-seventh Day of March, 2001

Attest:

NICHOLAS P. GODICI

*Attesting Officer*      Acting Director of the United States Patent and Trademark Office